UNITED STATES PATENT OFFICE.

ANDREW FRENCH, OF LARBERT, SCOTLAND.

PROCESS OF OBTAINING GOLD, SILVER, AND COPPER FROM ORES.

SPECIFICATION forming part of Letters Patent No. 490,193, dated January 17, 1893.

Application filed October 27, 1891. Serial No. 410,028. (No specimens.)

*To all whom it may concern:*

Be it known that I, ANDREW FRENCH, a subject of the Queen of Great Britain and Ireland, and a resident of Larbert, in the county of Stirling, Scotland, have invented certain Improvements in Processes of Obtaining Gold, Silver, and Copper from Ores, of which the following is a specification.

My invention has for its object the obtaining of gold, silver, and copper, from ores by improved combinations of processes, which are of special advantage in treating complex and refractory ores containing sulphur, and are applicable to ores containing also arsenic, antimony, tellurium, zinc or other ingredients found to interfere seriously with wet extraction processes hitherto in use.

The distinguishing part of the processes to be used in carrying out the invention is what may be termed a preparatory process or combination of processes when applied to some ores, and one which has to be followed, for the more complete obtainment of the precious metals, by processes which have heretofore been applied without such preparatory process and without obtaining good results in the case of complex and refractory ores. At the same time the so-called preparatory process will in most cases obtain in solution some of the metal or metals of the ores treated by it. In the so-called preparatory process the ore having intimately mixed with it small percentages of bisulphate of soda and common salt is furnaced at a red heat and is afterward leached or lixiviated. Metals rendered soluble by furnacing with the salts mentioned are washed out, while precious or other metals not thus separable are by the furnacing put into a condition in which they are very amenable to subsequent treatment.

In carrying out the invention in the case, for example, of an ore containing two and one-half to six per centum of copper and some gold and silver, the ore after being simply roasted or calcined to drive off as much of the sulphur as can be conveniently got rid of in that way, if it contains more than ten per centum of sulphur, is pulverized and mixed with from two to three per centum of "niter-cake" or bisulphate of soda, and from one to two per centum of common salt. The mixture put into a reverberatory or other suitable furnace is brought to a red heat, and maintained thereat, with a limited supply of air, for about an hour. With this treatment, all the copper, almost all the silver and a part of the gold will have been brought to the condition of salts soluble in slightly acidulated water. The furnaced materials are withdrawn from the furnace, allowed to cool, and then leached or lixiviated in the manner ordinarily practiced in the wet processes for extracting copper and silver. After the soluble metallic salts have been washed out, the well known chlorination process is applied in which chlorine gas is introduced beneath the false bottom of the leaching vessel and passed through the as yet undissolved materials until its odor is distinctly perceived above them. After one and one-half to two hours when all the gold will have become soluble, water slightly impregnated with chlorine is passed through the materials, and is led into vats or apparatus to be treated in any suitable known way for precipitating or separating the precious metal. Any other suitable known variation of the chlorination process may be used if preferred.

As affording another example of the application of the invention an ore may be taken containing little or no copper but principally silver and gold. In such a case I mix with the pulverized ore from one and one-half to two and one-half per centum of niter-cake and from one and one-half to two and one-half per centum of common salt, and furnace the mixture at a red heat for from forty to seventy minutes. When chlorine or hydrochloric acid is evolved the furnacing is continued until such evolution ceases or nearly ceases. The furnaced materials are leached and the bulk of the base metals, rendered soluble in the furnacing operation are washed out.

In the case of ores containing principally gold and silver, the materials left after furnacing and leaching may be treated by chlorination as hereinbefore described. It may however be desirable to first extract any silver not washed out by the acid water, by using a dilute solution of hyposulphite of soda or aqueous ammonia. Or cyanide of potassium may be used instead of chlorine to extract the gold. Any suitable known variety of the amalgamation process may also be used for completing the extraction of the precious metals. As with the chlorination and cyanide processes amalgamation effects a more complete extraction of the gold and silver, and along with them any platinum present, than when such processes are applied to refractory ores without the preparatory furnacing with niter-cake and common salt.

My improved combinations of processes are very economical in plant, labor, and time; and they are well adapted for treating the refractory form of copper ore containing monosulphide of iron and known as pyrrhotite. Ores which do not yield, or only with difficulty to ordinary chlorination, or treatment with cyanide of potassium, or amalgamation, readily give up their gold and silver to the improved combination of processes. In all cases, of course, the proportions of niter-cake or bisulphate of soda, and of the common salt must be modified to suit the ores treated; but in no case will the aggregate quantity of these salts require to be greater than ten per centum of the ores; and in most cases five per centum will suffice.

What I claim as my invention is:

In processes for obtaining gold, silver and copper from ores the treatment of the ores by pulverizing, mixing therewith small percentages of niter-cake or bisulphate of soda and common salt, furnacing at a red heat, and then leaching substantially as herein set forth.

In testimony whereof I have signed my name to this specification in the presence of two subscribing witnesses.

ANDREW FRENCH.

Witnesses:
EDMUND HUNT,
DAVID FERGUSON.